O. P. HOFFMAN.
BATTERY PLATE.
APPLICATION FILED MAY 24, 1919.
1,341,713.
Patented June 1, 1920.
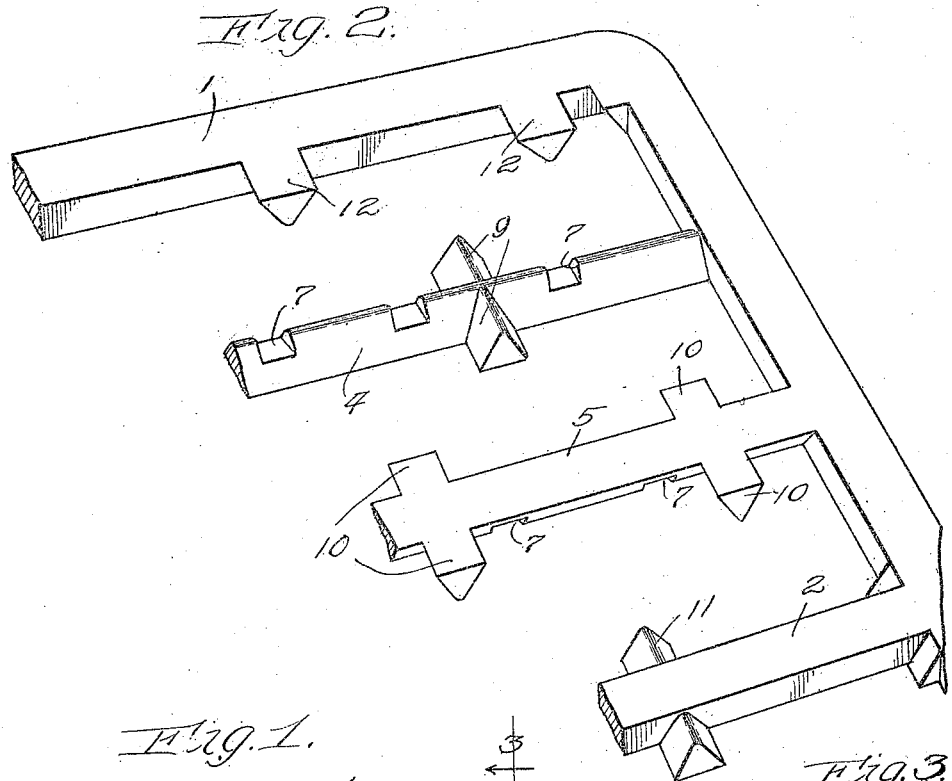
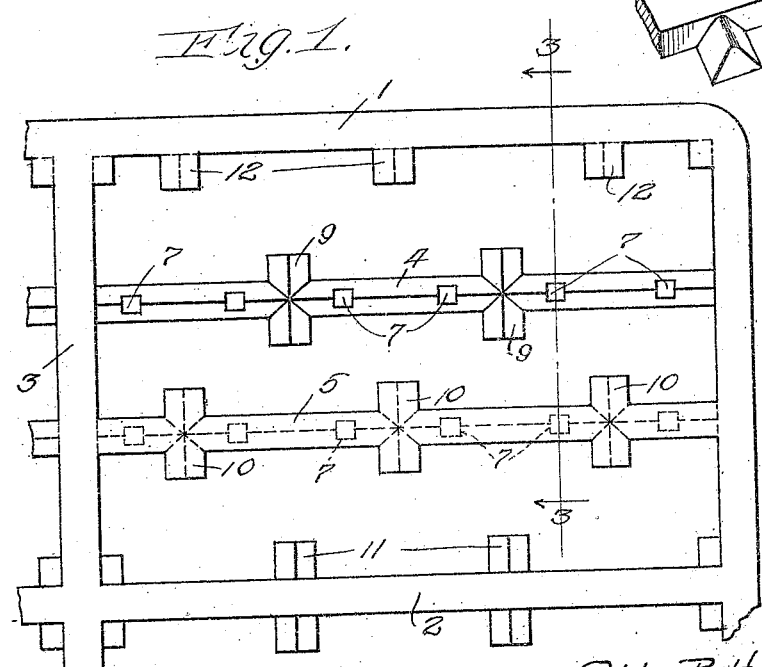
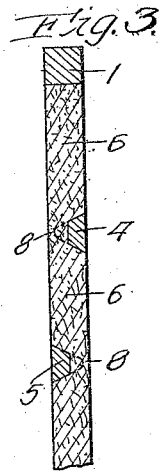
Witness:
G. L. Torrington
Inventor:
Otto P. Hoffman
by Albert Scheible
Attorney

UNITED STATES PATENT OFFICE.

OTTO P. HOFFMAN, OF CHICAGO, ILLINOIS.

BATTERY-PLATE.

1,341,713.  Specification of Letters Patent.  Patented June 1, 1920.

Application filed May 24, 1919. Serial No. 299,453.

*To all whom it may concern:*

Be it known that I, OTTO P. HOFFMAN, a citizen of Germany, residing at Chicago, county of Cook, and State of Illinois, have invented certain new and useful Improvements in Battery-Plates; and I do hereby declare the following to be a full, clear, and exact description of the invention, such as will enable others skilled in the art to which it appertains to make and use the same.

My invention relates to storage batteries, and in one aspect relates to the providing of storage battery plates which will effectively hold the active material (such as lead oxid) interlocked with the metal of the plate, while permitting the ready expansion and contraction of both the metal plate and the active material without causing either a warping or distortion of the plate or a cracking and dropping out of the active material. More particularly, my invention aims to provide a storage battery plate having ribs dividing sections of the plate into cells adapted to hold the active material, and having the consecutive ribs so shaped as to resist a movement of continuously connected parts of the active material toward relatively opposite faces of the plate. Furthermore, my invention aims to provide such an interconnecting of the active material in adjacent cells of the plate as to avoid a cracking of this material, and to afford cross-connecting portions of active material which will coöperate with the shape of the ribs in holding the entire filling of each plate section in position. Moreover, my invention aims to provide anchoring lugs extending partly across the individual cells and also formed for interlocking with active material to hold the latter in position in the cell, and for deterring the cracking of the active material. Likewise, my invention aims to provide a battery plate embodying the above features and having the parts so arranged as to be cheaply and speedily manufactured. Still further objects will appear from the following specification and from the accompanying drawings in which:

Figure 1 is an elevation of one corner section of the battery plate embodying my invention.

Fig. 2 is an enlarged perspective view of the extreme corner portion of the plate of Fig. 1.

Fig. 3 is a vertical section taken through the plate portion of Fig. 1 along the line 3—3.

In the drawings, my invention is shown as embodied in a battery plate of the general type in which relatively heavy bars divide the plate into sections or panels, and in which each panel is divided into parallel cells by relatively thin ribs. For example, Fig. 1 shows a battery plate having edge portions 1 and bars 2 and 3 bordering one panel of the same. This panel is divided into cells by the ribs 4 and 5, the space between these ribs being exaggerated and the ribs reduced in number to avoid confusion in the drawing. Both the edge bar 1 and the panel bars 2 and 3 are desirably rectangular in cross section, while the intermediate ribs 4 and 5 are of tapering cross-sections, with the taper oppositely directed on consecutive ribs. For example, the ribs are here shown as triangular in cross-section, with the sharp edge on the first rib directed toward one face of the plate, with the sharp edge of the second of these ribs directed toward the other face of the plate, and so on. Then I equip these ribs with grooves extending transversely of the same and desirably across the narrow faces, so as to afford channels connecting the consecutive cells.

When the paste of lead oxid or the like is introduced into the cells for the grid above described, this active material not only fills the cells, but also fills the channels 7, so that the active material in each panel of the plate consists of a series of parallel portions 6 disposed between the ribs and connected to each other by strips 8 as shown in Fig. 3. These connecting strips therefore unite the entire mass of the active material into a single body, so that its constituent portions are not free to move in different directions. I also desirably make the ribs of less depth than the panel bars 1, 2 and 3, so that the paste when flush with these bars will extend over the thin edges of the ribs. Consequently, since the slope of the walls of the ribs would only permit each panel section to move in the one direction, the different directions of these slopes will coöperate with the connecting strips 8 in holding the entire mass of active material interlocked with the plate. However, these strip connections will not interfere with the expansion of the active material during its formation, nor with the expansion and contraction of the metal parts of the plate, so that I can operate batteries containing these plates at high duty if necessary without either dislodging the active material or distorting the plates.

To supplement the action of the channels in retaining the active material in the cells, I may also provide lugs extending transversely of the cells from opposite sides of the latter. These lugs are desirably also of a tapering cross-section, with the taper oppositely directed on the lugs carried by consecutive ribs or bars. For example, the lugs 9 on the first rib in Fig. 1 may be undercut from the nearer face, while the corresponding lugs 10 on the second rib 5 are undercut from the opposite face of the plate. Thus arranged, it will be obvious that the taper due to the undercutting will cause the resulting lugs on consecutive ribs and bars to engage the active material in relatively opposite directions. To increase the hold on the material and to permit the use of fairly long lugs even with the close spacing of the ribs which is desirable in practice, I desirably stagger the lugs in position on the consecutive ribs, and I may also provide corresponding lugs 11 and 12 on the bars forming parts of the frame of each panel of the plate.

In practice, it will be evident from the illustrations that the plate of my invention can easily be molded for quick and cheap manufacture; that the taper of the ribs, the embedding of active material in the transverse channels and the tenoning of the lugs all cooperate in effectively anchoring the active material in position. Moreover, since the lugs only extend part way across the cells, they will not interfere with the free expansion and contraction of the ribs carrying the same, as would be the case if walls extending entirely across the cells and connected to the consecutive ribs were substituted for the lugs after the manner of the older practice. I am therefore able to obtain an unusually durable plate while employing a relatively simple and cheap construction. So also, although the active material in each panel has rather thin portions directly over the thin edges of the ribs, the transverse lugs interrupt the cell sections of this material, and the parts 8 embedded in the channels thicken these thin portions at intervals. Consequently, the expansion and contraction of the active material and of the plate will not cause a cracking of the material in ordinary operation, so that I avoid the cracking and falling out which might occur if I did not provide the channels 7 and the lugs 9.

However, while I have pictured and described my invention as embodied in a battery plate having ribs of a sharply triangular cross-section and as having the transverse channels formed across the sharp edges of the ribs, I do not wish to be limited to these or other details of the construction and arrangement here disclosed, it being obvious that the same might be modified in many ways without departing from the spirit of the appended claims.

I claim as my invention:

1. A storage battery plate comprising a peripheral rectangular frame, cross-bars dividing the frame into rectangular sections, and auxiliary bars spanning each section parallel to one side of the same to divide the section into panels, the auxiliary bars having transverse grooves, and active material filling the panels and the said grooves, whereby the active material in the grooves continuously connects the active material in the panels.

2. A storage battery plate as per claim 1, in which the auxiliary bars are triangular in section and in which the transverse grooves extend across the apexes of the triangularly sectioned bars.

3. In a grid for a storage battery plate, parallel ribs of triangular cross-sections, and free-ended lugs extending transversely from each rib toward the next rib, consecutive ribs having their ridges directed respectively toward opposite sides of the plate, and the lugs carried by each rib being tapered in the same direction as the rib carrying the same.

4. A storage battery plate, comprising a frame, ribs spanning the frame and of tapering cross-sections, free ended lugs extending transversely from the ribs and tapered in the same direction as the ribs carrying the same, and a panel frame thicker than the ribs and spanned by the latter, the ribs having channels parallel to the lugs thereon, and a filling of active material flush with the ribs and also filling the said channels.

Signed at Chicago, Illinois, May 20th, 1919

OTTO P. HOFFMAN.